US012058789B2

(12) United States Patent
Tipirneni et al.

(10) Patent No.: US 12,058,789 B2
(45) Date of Patent: Aug. 6, 2024

(54) SOLID STATE LIGHTING SYSTEMS AND ASSOCIATED METHODS OF OPERATION AND MANUFACTURE

(71) Applicant: Micron Technology, Inc., Boise, ID (US)

(72) Inventors: Anil Tipirneni, Boise, ID (US); Rui Zhang, Sammamish, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/335,885

(22) Filed: Jun. 15, 2023

(65) Prior Publication Data

US 2023/0328857 A1 Oct. 12, 2023

Related U.S. Application Data

(60) Continuation of application No. 17/505,304, filed on Oct. 19, 2021, now Pat. No. 11,723,127, which is a division of application No. 16/730,944, filed on Dec. 30, 2019, now Pat. No. 11,184,964, which is a continuation of application No. 16/276,443, filed on Feb. 14, 2019, now Pat. No. 10,555,394, which is a continuation of application No. 13/465,149, filed on May 7, 2012, now Pat. No. 10,251,233.

(51) Int. Cl.

*H05B 45/10* (2020.01)
*H05B 45/18* (2020.01)
*H05B 45/20* (2020.01)
*H05B 45/28* (2020.01)

(52) U.S. Cl.

CPC .................................... *H05B 45/20* (2020.01)

(58) Field of Classification Search

CPC ........ H05B 45/10; H05B 45/12; H05B 45/18; H05B 45/20; H05B 45/22; H05B 45/28

See application file for complete search history.

(56) References Cited

U.S. PATENT DOCUMENTS

| | | | |
|---|---|---|---|
| 6,397,091 | B2 | 5/2002 | Diab et al. |
| 6,576,881 | B2 | 6/2003 | Muthu et al. |
| 6,633,301 | B1 | 10/2003 | Dallas et al. |
| 7,319,298 | B2 | 1/2008 | Jungwirth et al. |
| 7,652,236 | B2 | 1/2010 | Cortenraad et al. |
| 7,718,942 | B2 | 5/2010 | Lim et al. |
| 7,804,260 | B2 | 9/2010 | Deurenberg |
| 10,251,233 | B2 | 4/2019 | Tipirneni et al. |
| 10,555,394 | B2 | 2/2020 | Tipirneni et al. |
| 2005/0276053 | A1 | 12/2005 | Nortrup et al. |
| 2006/0006821 | A1 | 1/2006 | Singer et al. |
| 2006/0066266 | A1 | 3/2006 | Li et al. |
| 2006/0237636 | A1 | 10/2006 | Lyons et al. |

(Continued)

FOREIGN PATENT DOCUMENTS

DE 202011102479 8/2012

*Primary Examiner* — Henry Luong

(74) *Attorney, Agent, or Firm* — Perkins Coie LLP

(57) ABSTRACT

A lighting system includes a solid state lighting device capable of generating mixed light and a controller. The solid state lighting device includes light sources for producing mixed light and a sensor configured to detect light from one of the light sources. The controller controls two or more of the light sources based on output from the sensor. The controller can communicate with the sensor to provide closed-loop control.

17 Claims, 10 Drawing Sheets

(56) References Cited

U.S. PATENT DOCUMENTS

| | | | |
|---|---|---|---|
| 2008/0065345 A1 | 3/2008 | Ooghe | |
| 2008/0157698 A1 | 7/2008 | Tan et al. | |
| 2008/0180040 A1 | 7/2008 | Prendergast et al. | |
| 2008/0246419 A1 | 10/2008 | Deurenberg | |
| 2008/0251690 A1 | 10/2008 | Keiper et al. | |
| 2008/0309255 A1 | 12/2008 | Myers et al. | |
| 2009/0109669 A1 | 4/2009 | Rains et al. | |
| 2010/0007588 A1* | 1/2010 | Zygmunt | G09G 3/30 345/82 |
| 2010/0072900 A1 | 3/2010 | Deppe | |
| 2010/0115830 A1 | 5/2010 | Dube | |
| 2010/0277410 A1 | 11/2010 | You et al. | |
| 2011/0279015 A1 | 11/2011 | Negley et al. | |
| 2013/0293114 A1 | 11/2013 | Tipirneni et al. | |
| 2019/0182916 A1 | 6/2019 | Tipirneni et al. | |
| 2020/0137851 A1 | 4/2020 | Tipirneni et al. | |

* cited by examiner

SOLID STATE LIGHTING SYSTEMS AND ASSOCIATED METHODS OF OPERATION AND MANUFACTURE

CROSS REFERENCE TO RELATED APPLICATIONS

This application is a continuation of U.S. application Ser. No. 17/505,304, filed Oct. 19, 2021, which is a divisional of U.S. application Ser. No. 16/730,944, filed Dec. 30, 2019, now U.S. Pat. No. 11,184,964, which is a continuation of U.S. application Ser. No. 16/276,443, filed Feb. 14, 2019, now U.S. Pat. No. 10,555,394, which is a continuation of U.S. application Ser. No. 13/465,149, filed May 7, 2012, now U.S. Pat. No. 10,251,233. Each of these applications is incorporated herein by reference in its entirety.

TECHNICAL FIELD

The present technology is related to solid state lighting systems and associated methods of operation and manufacture. In particular, the present technology is related to controlling multi-color solid state lighting systems using a color sensor.

BACKGROUND

Conventional lighting systems often include light-emitting diodes ("LEDs") capable of efficiently producing high-intensity, high-quality light. Mobile phones, personal digital assistants, monitors, displays, digital cameras, lamps, and refrigerator lights often have solid state lighting systems with LEDs. A group of different color LEDs can be used to produce a combined radiation emission. For example, a white light-emitting LED device ("white LED device") can be a white RGB LED device that includes a red light-emitting LED ("red LED"), a green light-emitting LED ("green LED"), and a blue light-emitting LED ("blue LED") that produce radiation emissions in the red region, green region, and blue region of the spectrum to make white mixed light.

Although LEDs produce less heat than many conventional lighting devices, LEDs can produce enough heat to cause a color shift (e.g., a shift of a peak emission wavelength) because the performance of light producing junctions can be highly temperature dependent. Fluorescent materials of light producing junctions also tend to deteriorate over long periods of time. It is difficult to compensate for changes in color coordinates due to color shifts and LED deterioration. White RGB LED devices often produce mixed light that appears off-white or yellow, which reduces the color fidelity of electronic devices.

Conventional lighting systems often include a temperature sensor used to monitor the junction temperatures of LEDs to compensate for peak emission wavelength shifts caused by temperature changes. To control the color coordinate of white mixed light, auxiliary red LEDs are used to increase the intensity of emitted red light to bring the combined radiation emission toward a target radiation emission to adjust the color rendering index ("CRI"). Unfortunately, auxiliary red LEDs occupy space on the LED mounting board resulting in a reduced number of sets of RGB LEDs.

Existing lighting systems have RGB sensors with three separate sensors, including a red sensor, a green sensor, and a blue sensor. These sensors are positioned in the luminaire to measure the individual light intensities of the red LED, green LED, and blue LED, respectively, in order to individually adjust the drive current to each LED to control the color coordinate of the mixed light. Temperature sensors, auxiliary red LEDs, and RGB sensors lead to increased manufacturing costs and complexity as well as increased energy consumption. Additionally, if these components occupy reflective space on the LED mounting board, the performance of the light/system can be reduced.

DETAILED DESCRIPTION

Lighting systems and associated methods of operating and manufacturing are described below. Lighting systems can include light sources in the form of solid state lights ("SSLs"). The term "SSL" generally refers to "solid state light" and/or "solid state lighting" according to the context in which it is used. The term "solid state transmitter" ("SST") generally refers to solid state components that convert electrical energy into electromagnetic radiation or conversely electromagnetic radiation into electrical energy. Lighting systems can include a single color sensor to control a multi-color SSL device with a plurality of SSTs, such as a plurality of different colored LEDs capable of producing a desired combined radiation emission. LEDs can include, without limitation, semiconductor diodes, polymer light-emitting diodes, high-efficiency UV light-emitting diodes, polymer phosphorescent light-emitting diodes, and organic light-emitting diodes. A person skilled in the relevant art will understand that the new technology may have additional embodiments and that the new technology may be practiced without several of the details of the embodiments described below with reference to FIGS. 1-13.

Figure 1:
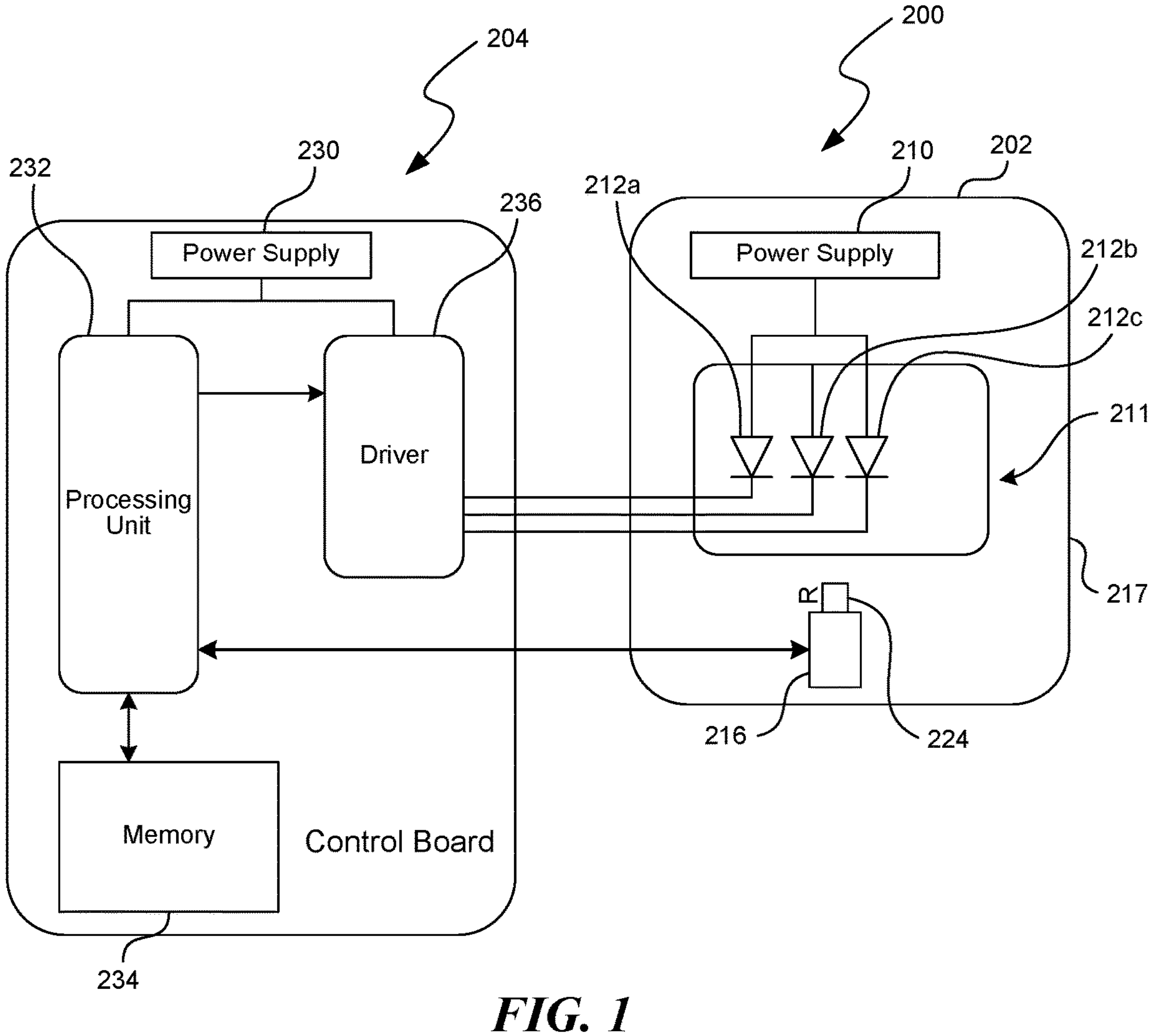
FIG. 1 is a schematic diagram of a lighting system in accordance with an embodiment of the disclosed technology.

FIG. 1 is a schematic diagram of a lighting system 200 in accordance with some embodiments of the technology. The lighting system 200 includes an SSL device 202 and a controller 204 programmed to control the SSL device 202. The SSL device 202 includes a power supply 210, an SST device 211, and a sensor 216. The power supply 210 delivers electrical energy to the SST device 211 and can be an AC power source, DC power source, or other suitable supply of power capable of outputting energy to the SST device 211. The SST device 211 is capable generating mixed light and includes a plurality of light sources in the form of SSTs 212*a*, 212*b*, 212*c* (collectively "212").

The sensor 216 is coupled to a substrate 217 and includes a single sensing element 224 positioned to measure a characteristic (e.g., intensity) of mixed light associated with the spectrum from the SST device 211 or only light associated with a spectrum from a single one of the SSTs 212. In some embodiments, the sensing element 224 is a photodiode that converts received radiation emissions into current or voltage to produce at least one signal that can be sent to the controller 204. For example, the detection spectral bandwidth of the sensing element 224 can significantly overlap with a range of spectral emissions from one or more of the SSTs 212. In some embodiments, the emitted radiation wavelength(s) or waveband(s) from one of the SSTs 212 can correspond with, or at least overlap with, the wavelength(s) or waveband(s) detectable by the sensing element. By way of example, the sensor 216 can be a single color sensor (e.g., a red color sensor, a green color sensor, a blue color sensor, or the like). If the sensor 216 is a red color sensor, the sensing element 224 can have a detection spectrum that includes the emission spectrum of the red SST 212*c* to measure a characteristic (e.g., light intensity, flux, color coordinate, radiation wavelength(s)/waveband(s), or the like) of light outputted by the SST 212*c* without measuring the same characteristics of the light outputted by SSTs 212*a*, 212*b*. The single color sensor 216 can have relatively small dimensions and can occupy less space on a substrate than an RGB sensor. As such, if the single color sensor 216 is installed on an SST mounting board, the single color sensor 216 may block less reflected light from a reflective layer of the SST mounting board compared to a conventional RGB sensor. Several embodiments of SSL devices 202 with a single color sensor 216 can accordingly provide enhanced performance compared to systems with RGB sensors. The sensor 216 can also include, without limitation, one or more lenses, filters, and/or amplifiers. The position and orientation of the sensor 216 can be selected to reduce, limit, or substantially eliminate ambient light that may affect the measurements of radiation emission(s) of interest.

Output from the sensor 216 can be used to compensate for changes in characteristics of mixed light emitted by the SST device 211. For example, the drive current delivered to the detected SST 212 or other SST 212 can be increased or decreased to compensate for unwanted effects that may result in mixed light of poor quality. The unwanted effects can include, without limitation, color shifts, changes in color temperature, or changes in color rendering index ("CRT") and can be attributed to, for example, changes in the ratio of the light intensities of the SSTs 212 caused by changes in junction temperatures, deterioration of semiconductor materials (e.g., fluorescent materials), or other types of deterioration that undesirably alters the ratio of light intensities. The SSL device 202 can consistently output mixed light with one or more desired characteristics (e.g., a color coordinate within a desired distance of a target white light curve, a desired color temperature, a desired CRT value, or the like over long periods of time). The sensor 216 can analyze light at preset times based on the desired level of control, power consumption, or the like. In other embodiments, the sensor 216 can continuously analyze the light.

The controller 204 can accurately adjust the characteristics of mixed light without utilizing an onboard temperature sensor or RGB sensor. The controller 204 includes a power supply 230, a processing unit 232, memory 234, and a driver 236. The power supply 230 can output electrical energy that is delivered to the processing unit 232 and the driver 236. In some embodiments, the power supply 230 also outputs electrical energy to the SSTs 212 or other components of the SSL device 202. The processing unit 232 is communicatively coupled to the driver 236 and the SSL device 202 and can be programmed to control the SSL device 202 based on one or more signals from the sensor 216 by, for example, adjusting the characteristics of the mixed light emitted from the SSL device 202, controlling the power consumption, managing the rate of deterioration of the SSTs 212, or the like. The processing unit 232 can include, without limitation, one or more computing devices, central processing devices, microprocessors, digital signal processors (DSP), and/or application-specific integrated circuits (ASIC), as well as amplifiers, signal processing devices, or the like. The controller 204 can output drive current signals, pulse width modulation signals, trigger signals (e.g., sensor triggering signals), or the like.

The memory 234 can include, without limitation, a computer readable medium, volatile memory, non-volatile memory, read-only memory (ROM), random access memory (RAM), and the like. The processor unit 232 and memory 234 can be supplemented by, or incorporated in, logic circuitry. The memory 234 can store one or more databases, algorithms, tables, models, programs (e.g., software, executable code, a set of instructions, a sequence of instructions to perform one or more tasks, or the like), or the like. In some embodiments, the memory 234 stores a reference database that includes reference characteristics (e.g., reference light intensities, reference drive currents, reference fluxes, reference chromaticity color coordinates, reference CRI values, reference color temperatures, or the like), measured values (e.g., intensity measurements for individual SSTs, flux measurements for individual SSTs, light intensity measurements for a group of SSTs, flux measurements for a group of SSTs, or the like), and other types of information, including temperature versus CCT relationships (e.g., junction temperatures versus CCT relationships, age of SSTs versus CCT relationships, or the like), temperature versus radiation emission relationships (e.g., junction temperature versus peak wavelength relationships), or the like. In some embodiments, the reference characteristics include target characteristics, such as target chromaticity (e.g., target color coordinates, target region of chromaticity diagram, target portion of a Planckian locus curve, etc.), target color temperatures, target CRI values, or the like.

The processing unit 232 can receive feedback from the sensor 216 to evaluate the current delivered to each SST 212*a*, 212*b*, 212*c*. The driver 236 can include separate driver modules that drive respective SSTs 212. In some embodiments, the processing unit 232 determines the junction temperatures based on feedback from the sensor 216. For example, the processing unit 232 can determine an estimated junction temperature based on a measured intensity or flux from one of the SSTs 212. The driver 236 can control the SSTs based on the estimated junction temperature to obtain the desired output. This process can be repeated for every interrupt received from the sensor 216 such that the processing unit 232 keeps track of the performance of the SSL device 202 in order to manage power consumption, performance, or the like.

The SST device 211 can be configured to produce white mixed light. The SST 212*a* can be a blue LED, the SST 212*b* can be a green LED, and the SST 212*c* can be a red LED, although embodiments are not so limited. The blue LED 212*a* can generate light having a maximum intensity at a wavelength in the blue region of the spectrum. The green LED 212*b* can generate light having a maximum intensity at a wavelength in the green region of the spectrum. The red LED 212*c* can generate light having a maximum intensity at a wavelength in the red region of the spectrum. In certain embodiments, the SST 212*a* is capable of emitting blue light having a peak wavelength in a range of about 430 nanometers to about 470 nanometers. The SST 212*b* is capable of emitting yellow-green light or green light having a peak wavelength in a range of about 500 nanometers to about 570 nanometers. The SST 212*c* is capable of emitting red light having a peak wavelength in a range of about 600 nanometers to about 670 nanometers. The emissions from all of the SSTs 212 are combined to produce mixed light that can appear white. In other embodiments, the SSTs 212 can have peak wavelengths in other regions of the spectrum (including infrared, visible, ultraviolet, etc.) to produce a wide range of mixed light of different colors. The controller 204 can control the SST device 211 based on the intensity of light from only one of the SSTs 212. If the sensor 216 is sensitive to light from the SST 212*c*, the controller 204 can set the current to the SST 212*c*, SST 212*a*, or SST 212*b* based on the measured light intensity from the SST 212*c*.

The system 200 can provide closed-loop control of the SSL device 202 without utilizing an onboard temperature sensor or an RGB sensor. The controller 204 can compare the output from the sensor 216 to a reference value stored in memory 234. The controller 204 can control the driver 236 based at least in part on the comparison to adjust the drive signal sent to the SSL device 211. In some embodiments, the processing unit 232 can estimate one or more junction temperatures based on the measured light intensity. The junction temperature of the red SST 212*c* can be determined based on the measured intensity of the radiation emission of red light and a predetermined relationship between the intensity of the radiation emission of red light and the junction temperature of the red SST 212*c*. Relationships between the intensity of the radiation emission and junction temperatures are discussed in connection with FIG. 7. The junction temperatures of one or both SSTs 212*a*, 212*b* can be estimated based on the junction temperature of the red SST 212*c*. For example, the junction temperatures of one or both SSTs 212*a*, 212*b* can be substantially equal to the junction temperature of the SST 212*c*. Based on the estimated junction temperatures, the controller 204 can determine an estimated ratio of light intensities from the SST device 210 and can individually control the drive signals to the SSTs 212 to change the ratio of light intensities as desired.

The lighting system 200 can be used in a wide range of electronic devices, including mobile phones (including smart phones), personal digital assistants, monitors, digital cameras, lamps, and refrigerator lights. The lighting system 200 can provide backlighting for electronic devices. In some embodiments, the controller 204 can control an array of SSL devices to, for example, provide backlighting. Each SSL device can be controlled by a dedicated driver. In some embodiments, the single driver 236 can control a plurality of SSL devices.

Figure 2:
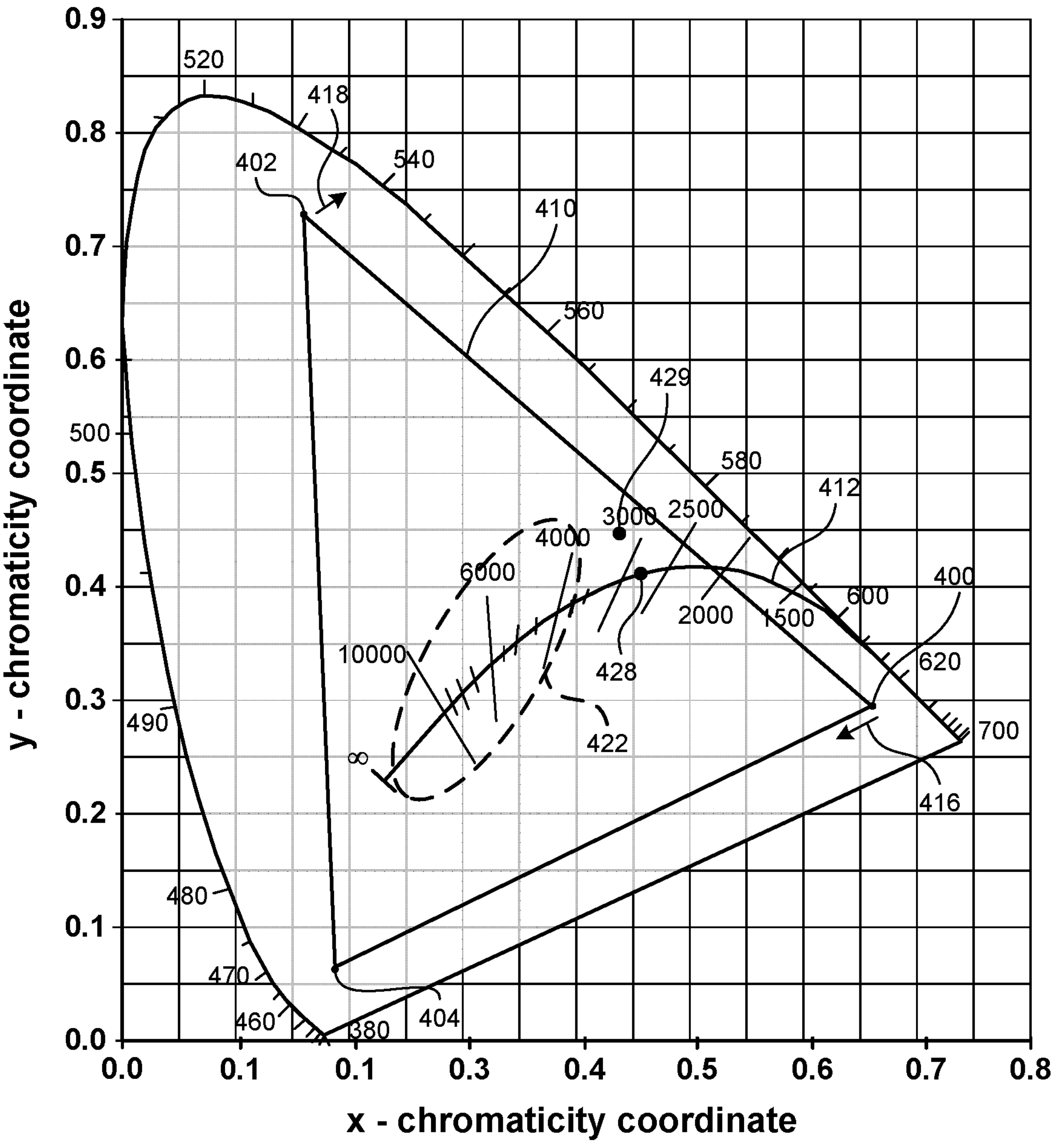
FIG. 2 is a chromaticity diagram with a color space for a multi-color LED device in accordance with an embodiment of the disclosed technology.

The chromaticity of the combined radiation emissions can be used to evaluate the quality of the emissions. FIG. 2 shows a CIE (Commission Internationale de L'Eclairage) 1931 chromaticity diagram with x, y chromaticity coordinates and output from a white RGB LED device. In one example, the white RGB LED device has a red LED capable of emitting light with a peak emission at 400 in a red region of the spectrum, a green LED capable of emitting light with a peak emission wavelength at 402 in the green region of the spectrum, and a blue LED capable of emitting light with a peak emission wavelength at 404 in the blue region of the spectrum. A triangle 410 shows the color space of the color gamut that can be produced by individually controlling the current delivered to the red LED, green LED, and blue LED. A curve 412 corresponds to the Planckian locus. Color temperatures 10000 K, 6000 K, 3000 K, 2500 K, 2000 K, and 1500 K are labeled along the curve 412. A region 422 corresponds to generally white light. To produce white light comparable to sunlight or incandescent light, the chromaticity coordinates of the combined emission can be kept as close as possible to the portion of the curve 412 in the region 422. For example, mixed light at 428 can have characteristics similar to sunlight. The mixed light can be moved along the curve 412 to adjust the CRI. For example, the intensity of the individual radiation emissions can be increased to keep the CRI at or above a desired level (e.g., 80, 90, or 95) without utilizing, for example, auxiliary LED.

Because human eyes can perceive relatively small deviations from the curve 412, it is difficult to maintain the desired chromaticity consistently over extended periods of time. More specifically, the chromaticity shifts because the performance of the SSL device is temperature dependent and/or the materials of the SSL device tend to degrade. An example of a perceivable change in color is shown in FIG. 2. At high temperatures, the red LED's peak emission wavelength can shift, as indicated by an arrow 416, while the green LED's peak emission wavelength can shift, as indicated by an arrow 418. The color deviations can move the mixed light from 428 to 429. At 429, the mixed light appears yellow or off-white. In the embodiment shown in FIG. 1, the controller 204 can be programmed to compensate for the color shifts of the LEDs to bring the mixed light at 429 toward the curve 412.

Figure 3:
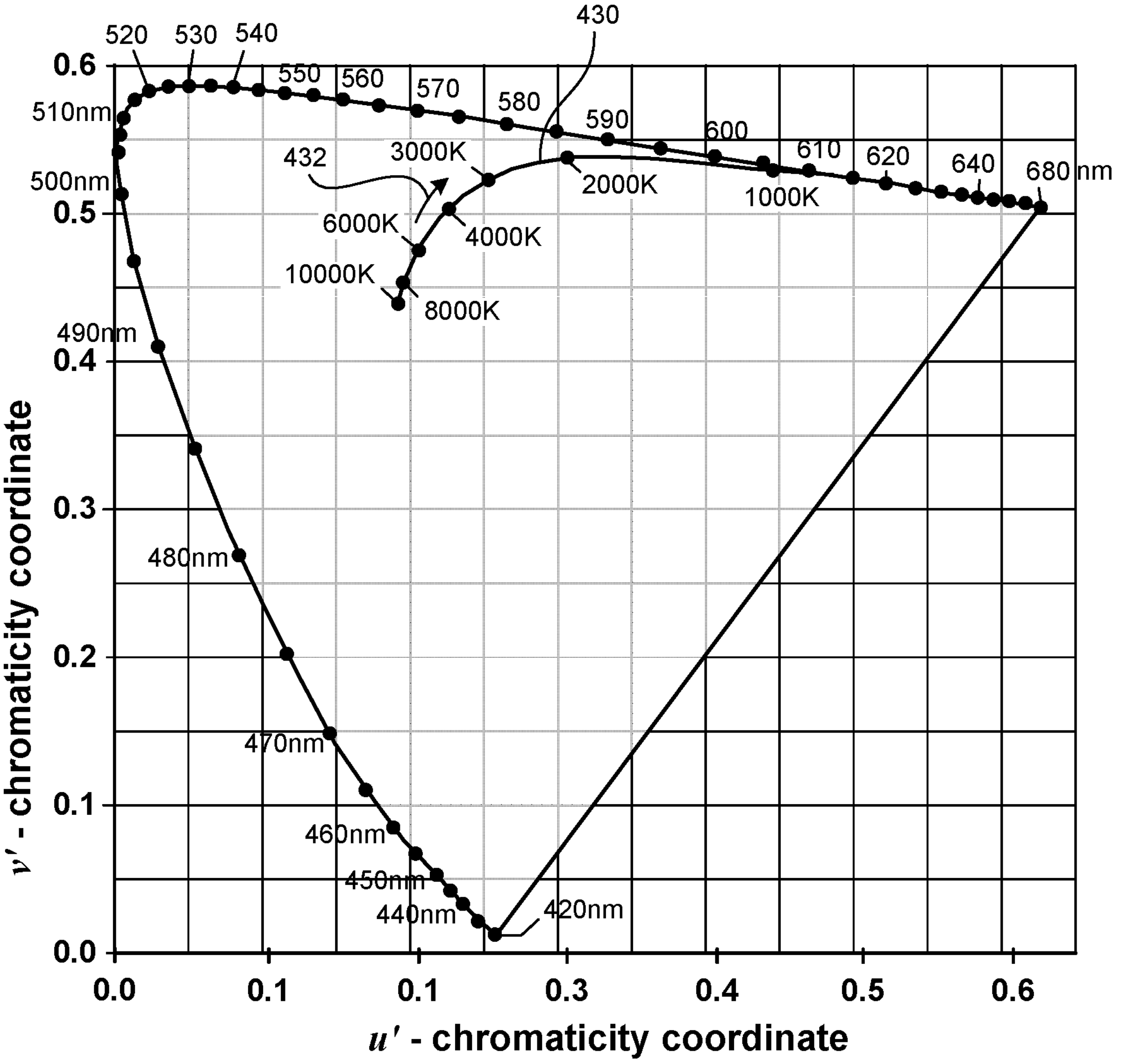
FIG. 3 is a chromaticity diagram with a Planckian locus curve.
Figure 4:
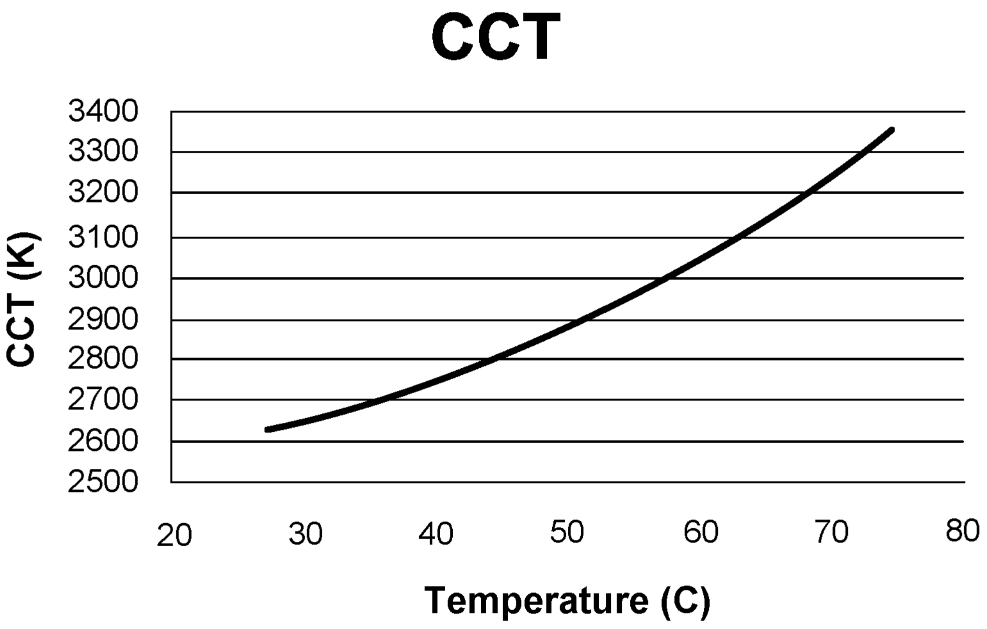
FIG. 4 is a plot of junction temperature versus correlated color temperature for an LED.

FIG. 3 is a CIE 1976 chromaticity diagram with u', v' coordinates. The curve 430 is the Planckian locus. The correlated color temperature ("CCT") values are labeled along the curve 430. FIG. 4 shows the junction temperature versus CCT for an LED device that has greenish white LEDs and red LEDs. The CCT of the combined emission increases as the junction temperatures increase, as indicated by an arrow 432 in FIG. 3.

Figure 5:
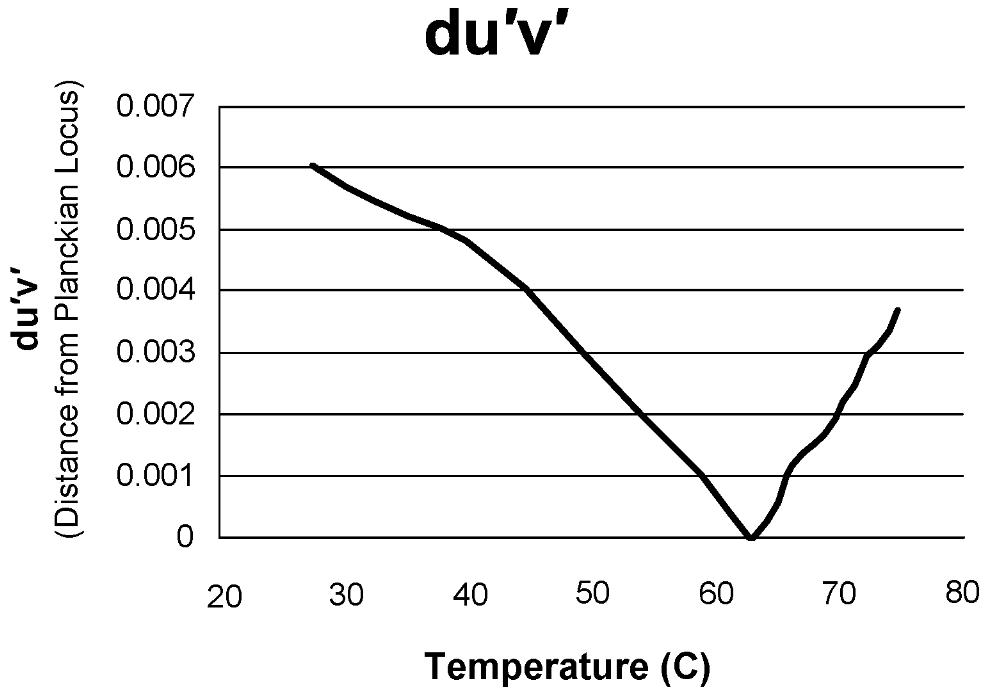
FIG. 5 is a plot of junction temperature versus distance from a Planckian locus curve for an LED.

FIG. 5 shows the difference in magnitude (du'v') from the Planckian locus to the measured combined radiation emission color as a function of junction temperature without compensation. At about 62 degrees Celsius, the mixed light is located generally along the curve 430 of FIG. 3 in this example. At about 50 degrees, the distance from the Planckian locus curve 430 is about 0.003.

The controller 204 of FIG. 1 can be programmed to decrease a difference, if any, between a characteristic of the mixed light and a target characteristic. In some embodiments, the color coordinate of the mixed light can be moved towards a target color coordinate positioned along the curve 430 by adjusting the ratios of light intensities. The ratio of light intensities of the mixed light can be adjusted to keep the mixed light within a maximum difference in magnitude (e.g., 0.005, 0.003, 0.002, 0.001, or the like) of the locus curve 430. The ratio of intensities can also be adjusted to increase or decrease the color temperature.

Figure 6:
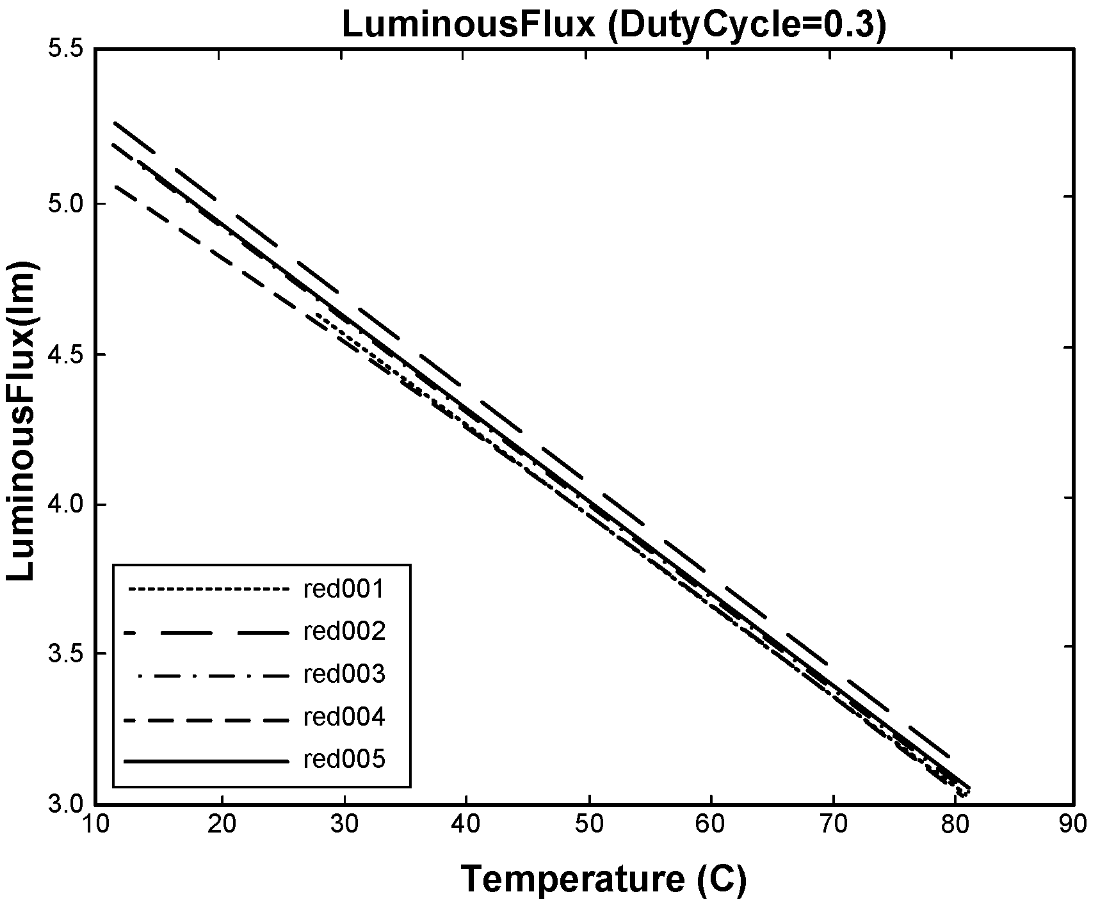
FIG. 6 is a plot of junction temperature versus luminous flux for five red LEDs.
Figure 7:
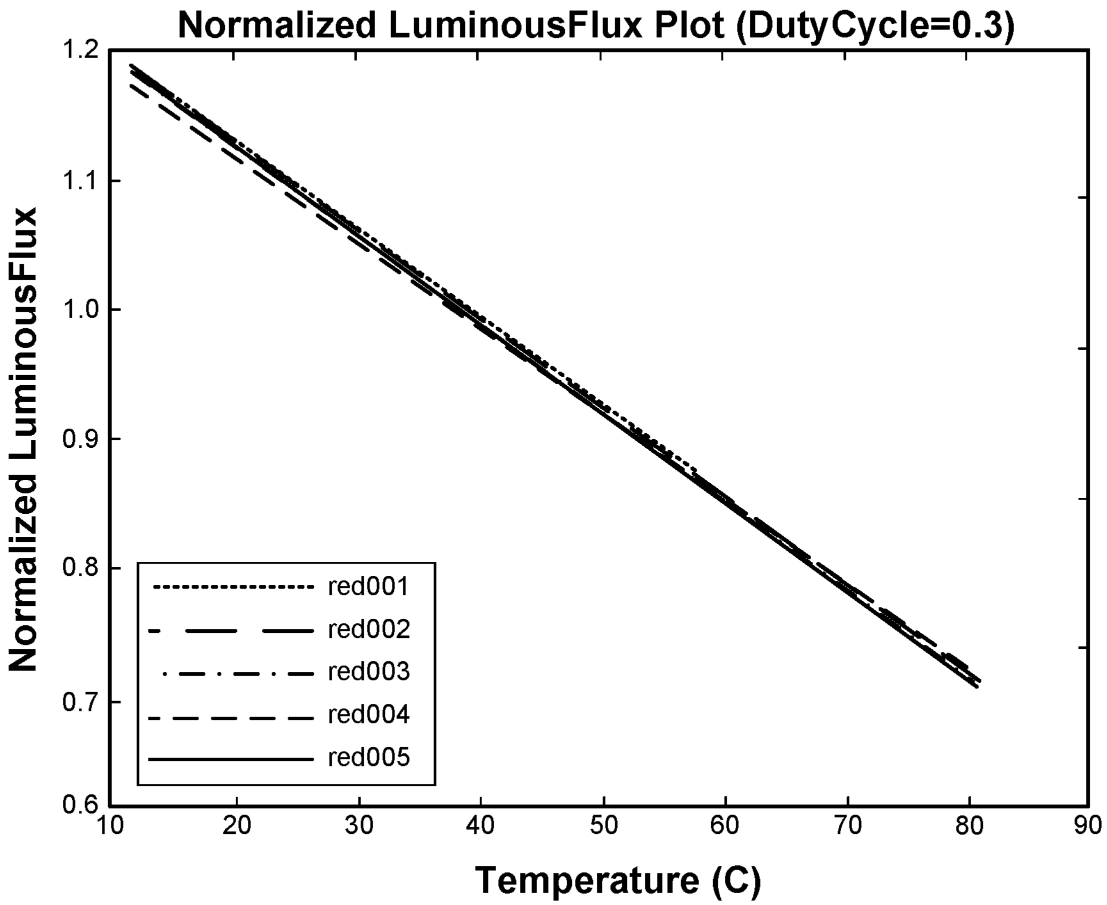
FIG. 7 is a plot of junction temperature versus normalized luminous flux for five red LEDs.

FIG. 6 shows the relationship between junction temperature and luminous flux for five red LEDs of the same type. As the junction temperatures increase, the luminous flux decreases generally linearly. The luminous flux can be normalized, as shown in FIG. 7, and the temperature versus normalized luminous flux can be used to develop a model for controlling the LEDs based upon the light intensity measured by a sensor associated with a specific spectrum. Based on a measured luminous flux (or intensity), a junction temperature can be estimated for the LED based on the model. The model can be used to predict behavior of four other red LEDs with unknown characteristics. Additionally, models can be developed for other color light sources, including blue LEDs, green LEDs, or the like.

Figure 8:
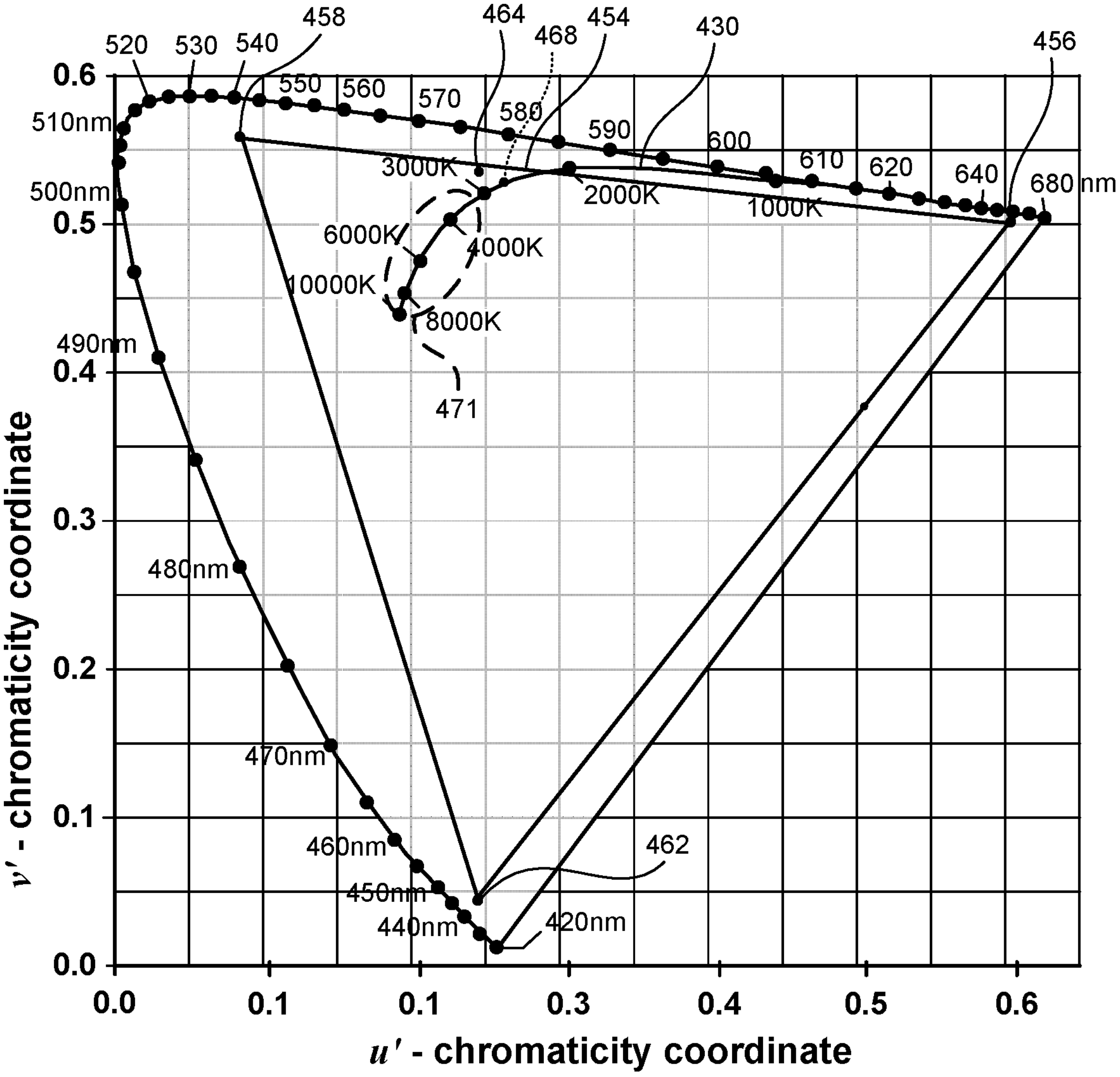
FIG. 8 is a chromaticity diagram with chromaticity coordinates for a multi-color LED device.

FIG. 8 is a chromaticity diagram with a color space 454 for an SST device that emits radiation at 456 in the red region of the spectrum, radiation at 458 in the green region of the spectrum, and radiation at 462 in the blue region of the spectrum. As shown in FIG. 8, mixed light at 464 can be spaced away from a target curve 430. The relative light intensities can be changed to move the mixed light from 464 to a target color coordinate at 468, as indicated by the arrow 469 in FIG. 9.

Figure 9:
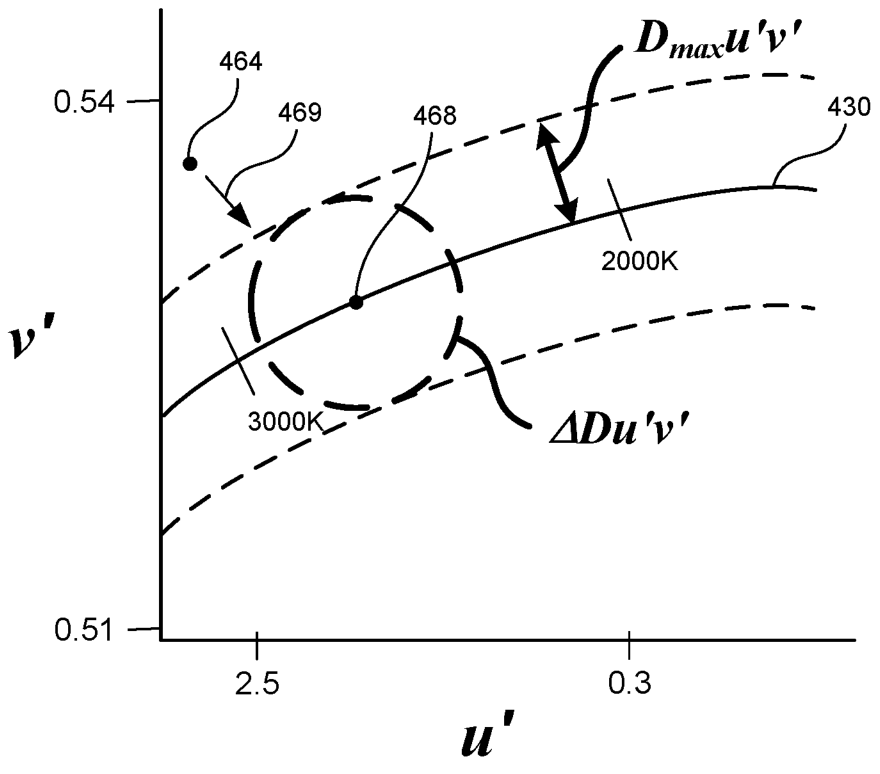
FIG. 9 is a detailed diagram with a portion of the Planckian locus curve of FIG. 8.

Referring to FIGS. 1 and 8, the controller 204 can be programmed to limit the distance between the mixed light and the target curve 430. FIG. 9 shows a targeted range (shown in phantom line) in which the mixed light can be kept with respect to the target color coordinate 468. ΔDu'v' can be selected based on the desired level of control. In some embodiments, a distance $D_{max}$u'v' can be equal to or less than about 0.005, 0.003, 0.002, 0.001, as discussed in connection with FIG. 5. The mixed light can also be kept within a white region 471 (see FIG. 8) and at a distance $D_{max}$u'v' less than a maximum distance (e.g., 0.001). The relative intensities of light can also be adjusted to move the mixed light along the curve 430 to increase or decrease the color temperature.

Figure 10:
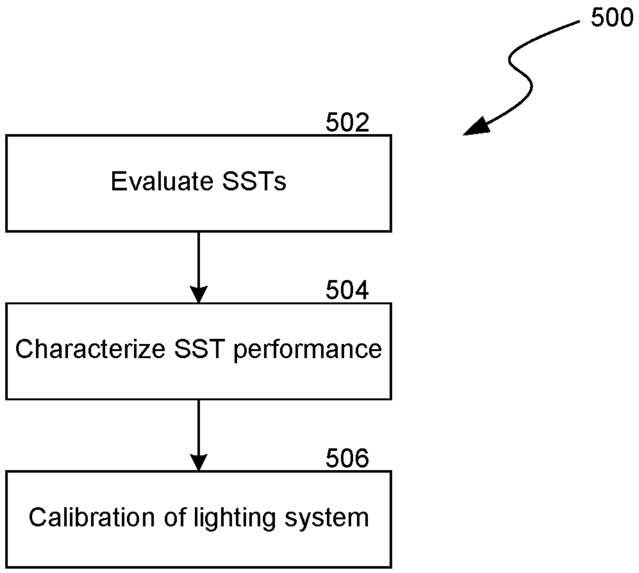
FIG. 10 is a flow diagram of a method for calibrating a lighting system in accordance with an embodiment of the disclosed technology.

FIG. 10 is a flow diagram of a closed-loop calibration system 500. At 502, the SST, such as LEDs, are evaluated to determine the characteristics of each LED. Exemplary characteristics include, without limitation, junction temperature, light intensity, flux, power consumption, and/or color coordinates. A range of drive currents can be delivered to each LED to determine the characteristic curves (e.g., junction temperature versus intensity/flux curves, junction temperature versus du'v' curves, junction temperature versus CCT curves, or the like).

At 504, reference performance characteristics for a set of LEDs (e.g., a group of red LEDs, a group of green LEDs, or the like) can be determined using the information obtained at 502. Reference performance characteristics may vary between different color LEDs, LEDs from different manufactures, or LEDs from different batches. Any number of LEDs can be evaluated to obtain normalized flux curves, normalized flux-current curves, normalized intensity curves, and/or normalized intensity-current curves. In some calibration procedures, a normalized intensity model is generated and used to estimate a temperature (e.g., a junction temperature, a board temperature, or the like) based on the measured intensity or flux at one temperature. By way of example, red LEDs can have generally the same temperature to luminous flux relationship as shown FIG. 7. Based on a measured flux or intensity and the known slope of the curve, the junction temperature of the red LED can be estimated based at least in part on the measured flux or intensity.

At 506 of FIG. 10, a light system is calibrated using the reference performance characteristics. Spectrum measurements, red sensor measurements, and/or temperature measurements (e.g., junction temperatures, board temperatures, or the like) for each group of LEDs of a white LED device can be inputted specified currents. Drive currents can be programmed based on the known characteristics of the LEDS. A target intensity or flux value and at target current value for each group of LEDs can be determined for a specified temperature. A red sensor reading for each group of LEDs can be compared (e.g., mapped) with the spectrum and flux level or intensity level of each group of LEDs. With a normalized flux model as a function of temperature and/or current, a controller can generate a sensor measurement model as a function of, for example, operating temperatures (e.g., junction temperature, board or substrate temperatures, current, or the like). These models can be stored. For example, a normalized flux model and associated tables can be stored in the memory 234 of FIG. 1.

Figure 11:
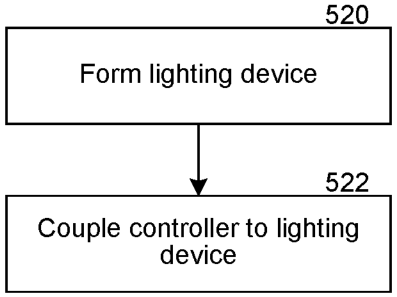
FIG. 11 is a flow diagram of a method for manufacturing a lighting system in accordance with an embodiment of the disclosed technology.

FIG. 11 is a flow diagram of a method of manufacturing a lighting system. For convenience, the method is discussed in connection with the lighting system 200 of FIG. 1. At 520, the SSL device 202 is formed. The sensor 216 is coupled to the substrate 217 and positioned to receive mixed light (e.g., light comprising light from all the SSTs 212) or light from only one SST 212. Circuitry can be used to connect the various components of the SSL device 202.

At 522, the controller 204 is coupled to the SSL device 202. The controller 204 can be programmed before or after it is coupled to the SSL device 202. Programming can include installing software. In some embodiments, programming includes storing, without limitation, databases, algorithms, tables, models, and/or programs in the memory 234.

Figure 12:
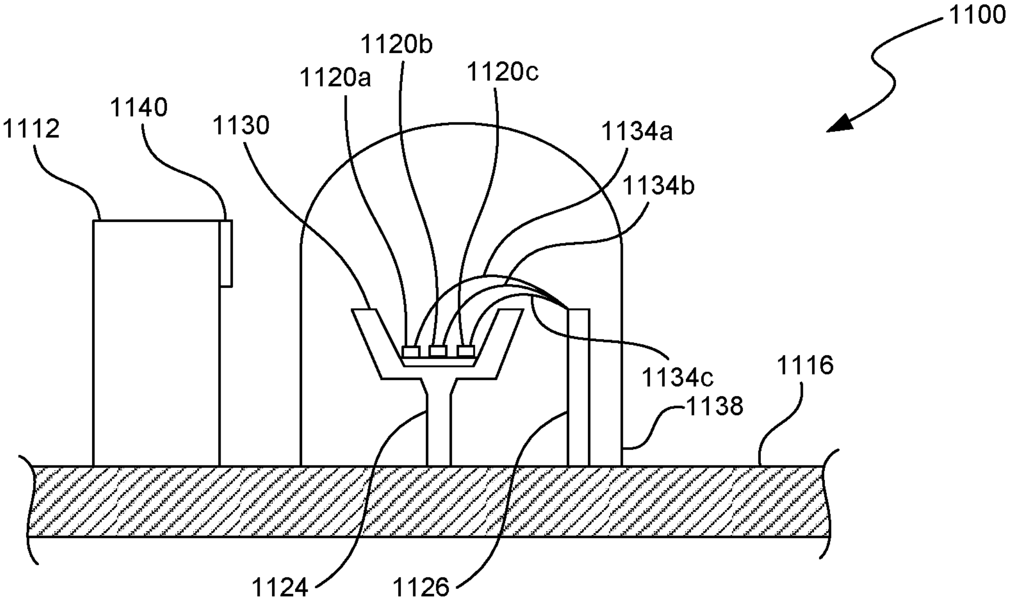
FIG. 12 is a schematic side view of a portion of a lighting system in accordance with an embodiment of the disclosed technology.

FIG. 12 is a schematic side view of a portion of a lighting system in accordance with an embodiment of the technology that includes an SSL device 1110, a light detector 1112, and a substrate 1116. The SSL device 1110 is capable of generating mixed light and can include a plurality of light sources, such as three SSTs 1120*a*, 1120*b*, 1120*c* (collectively "1120"). The light detector 1112 can be a single color sensor configured to detect the spectrum of light from one of the SSTs 1120 and send signals to another component, such as a controller. The SSL device 1110 can also include interconnects, lenses, optical diffusers, thermal pads, electrodes, reflective features (including reflective layers), or the like. The number, types of SSTs (e.g., edge emitting LEDs, surface emitting LEDs, super luminescent LEDs, or the like), and characteristics (e.g., peak wavelength, emission spectrum, intensity, or the like) of the SSTs can be selected to produce mixed light that appears a desired color to human eyes. The SSL device 1110 can also include electrodes 1124, 1126 mounted on the substrate 1116. The electrode 1124 can include a reflector 1130 that reflects light emitted from the SSTs 120. The SSTs 120 can be wire bonded to the electrode 1126. In the illustrated embodiment, wires 1134*a*, 1134*b*, 1134*c* electrically connect respective SSTs 1120*a*, 1120*b*, 1120*c* to the electrode 1126.

The sensor 1112 is mounted on the substrate 1116 and spaced apart from a housing 1138 (e.g., a lens, encapsulant, or the like) of the SSL device 1110. The sensor 1112 can receive light directly (e.g., non-reflected light) from the LEDs 1112. Alternatively, the sensor 1112 can be located within the housing 1138. For example, the sensor 1112 can be a photo detector that is coupled to the reflector 1130 or other component of the SSL device 1110. The position and orientation of the sensor 1112 can be selected to ensure that the sensor 1112 is capable of receiving radiation emissions to be measured. The sensor 1112 includes a sensing element 1140 that includes one or more photodiodes that converts received radiation emissions into current or voltage to produce at least one signal that can be sent to another component, such as a controller.

The substrate 1116 of FIG. 12 can be a board having one or more interconnects, vias, pads (e.g., bonding pads, thermal pads, of the like), electrodes, reflective features (e.g., reflective layers), or the like. In some embodiments, the substrate 1116 includes interconnects that provide electrical energy to pads to which the electrodes 1124, 1126 are coupled. Interconnects can communicatively couple the sensor 1112 to another component (e.g., a controller, an amplifier, or the like).

The SSL device 1110 can be used to provide closed-loop control of the SSTs 1120 to produce mixed light with the desired emission characteristics, including, without limitation, color coordinates of the mixed light, color temperature, ratio of light intensities of the mixed light, total flux of the mixed light, or the like. In closed-loop embodiments, the sensor 1112 can measure only radiation emissions in the one region of the spectrum. Based on the measurements, a controller can individually adjust the current to one or more of the SSTs 1120 to, for example, keep the color coordinates of the mixed light constant or within a desired range (e.g., a target range associated with a Planckian locus curve), adjust the ratio of light intensities, adjust the total flux, or the like.

Figure 13:
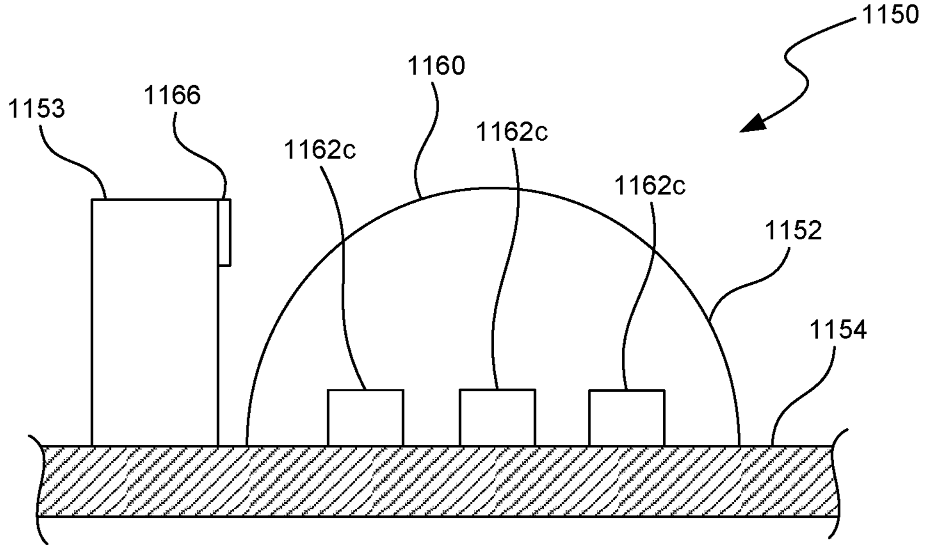
FIG. 13 is a schematic side view of a portion of a lighting system in accordance with an embodiment of the disclosed technology.

FIG. 13 shows a lighting system 1150 that includes an SSL device 1152, a sensor 1153, and a substrate 1154 in accordance with another embodiment of the technology. The SSL device 1152 includes a lens 1160 and a plurality of light sources, illustrated as LEDs 1162*a*, 1162*b*, 1162*c* (collectively "1162") mounted on the substrate 1154. The LEDs 1162 can be similar or identical to the SSTs 1120 of FIG. 12. The substrate 1154 can have interconnects that provide electrical energy to each of the LEDs 1162. The sensor 1153 and sensing element 1166 are positioned outside of the SSL device 1152 and may block less reflected light from a reflective layer of the board 1154 compared to a conventional RGB sensor. In other embodiments, the sensor 1153 is part of the SSL device 1152. For example, the sensor 1153 can be disposed within the lens 1160. In yet other embodiments, the sensor 1153 can be mounted on a separated substrate (e.g., a printed circuit board) to which the lighting system 1150 is mounted.

From the foregoing, it will be appreciated that specific embodiments of the invention have been described herein for purposes of illustration, but well-known structures and functions have not been shown or described in detail to avoid unnecessarily obscuring the description of at least some embodiments of the invention. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list.

From the foregoing, it will be appreciated that specific embodiments described above are for purposes of illustration and that various modifications may be made without deviating from embodiments of the invention. Aspects of the disclosure described in the context of particular embodiments may be combined or eliminated in other embodiments. Further, while advantages associated with certain embodiments of the disclosure may have been described in the context of those embodiments, other embodiments may also exhibit such advantages, but not all embodiments need necessarily exhibit such advantages to fall within the scope of the disclosure. For example, embodiments with light sources in the form of LEDs may have particular advantages. Exemplary non-limiting LED colors include blue, red, amber, green, white, yellow, orange-red, ultraviolet, and the like. However, light sources can also be in the form of other types of light generating elements, such as a laser light emitting elements, capable of emitting non-coherent light, coherent light, or the like. Lighting systems can also have light source that emit light sequentially or concurrently to produce combined emissions of different colors. The SSL devices can have a wide range of configurations. For example, the SSL device 202 of FIG. 1 can be similar or identical to the SSL device 110 of FIG. 12 or the SSL device 152 of FIG. 13 or it can have other configurations. Various features of the SSL devices can be combined based on the desired performance. Related U.S. application Ser. No. 13/465,149 (US Pub. No. 2013/0293114), filed May 7, 2012 is incorporated by reference in its entirety. Accordingly, the present invention is not limited to the embodiments described above, which were provided for ease of understanding, but rather the invention includes any and all other embodiments defined by the claims.

What is claimed is:

1. A lighting system, comprising:

a solid state lighting device having a first light source and a second light source;

a sensor configured to measure an intensity of light generated by the first light source; and a controller communicatively coupled to the solid state lighting device and the sensor, the controller has memory containing instructions for causing the lighting system to performing a process including:

storing temperature compensation data for producing targeted mixed light, wherein the temperature compensation data includes a reference intensity, and at least one of junction temperature data, color temperature data, target color temperature data, or color rendering index data;

selecting at least portion of the temperature compensation data corresponding to the measured light intensity from the sensor;

comparing at least a portion of the measured intensity of light to the reference intensity of the temperature compensation data;

determining a current for the second light source based on the comparison of the measured intensity of light to the reference intensity to compensate for one or more temperature effects of the second light source.

2. The lighting system of claim 1, wherein the temperature compensation data is configured to enable compensation for emission changes of the second light source caused by temperature changes of the second light source.

3. The lighting system of claim 1, further comprising:

determining a first relationship between light intensity of light emitted by the first light source and an operational characteristic of the first light source;

determining a second relationship between light intensity of the second light source and an operational characteristic of the second light source; and controlling operation of the lighting system based on both the first relationship and the second relationship.

4. The lighting system of claim 1, wherein the process further comprises compensating for the one or more temperature effects without measuring an intensity of the light generated by the second light source.

5. The lighting system of claim 1, wherein the process further comprises adjusting operation of the first and second light sources over a predetermined period of time.

6. The lighting system of claim 1, wherein the process further comprises controlling operation of both the first light source and the second light source without detecting light from either of the first or second light sources.

7. The lighting system of claim 1, wherein the process further comprises controlling operation of the solid state lighting device based on a relationship between light generated by the first light source and an operational characteristic of at least one of the first light source or the second light source.

8. The lighting system of claim 1, wherein the process further comprises comparing the measured intensity of light to a reference set of operational data associated with the second light source.

9. A lighting system, comprising:

a solid state lighting device having a first light source, a second light source, and a single color sensor configured to detect light from the first light source, wherein the solid state lighting device uses only the single color sensor; and a controller communicatively coupled to the solid state lighting device, the controller has memory containing instructions for performing a process including:

storing temperature compensation data for producing targeted mixed light, wherein the temperature compensation data includes at least two of reference intensity data, junction temperature data, color temperature data, target color temperature data, or color rendering index data, measuring, using the single color sensor, an intensity of light generated by the first light source;

selecting at least portion of the temperature compensation data corresponding to the measured light intensity;

controlling the second light source based on the at least selected portion of the temperature compensation data so as to compensate for temperature effects of the second light source; and controlling operation of both the first light source and the second light source without concurrently detecting either of the light from the first light source or light from the second light source.

10. The lighting system of claim 9, wherein the process further comprises compensating for emission changes of the second light source caused by temperature changes of the second light source by using temperature compensation data stored by the memory.

11. The lighting system of claim 9, wherein the process further comprises compensating for temperature effects of the second light source without measuring an intensity of the light generated by the second light source.

12. The lighting system of claim 9, wherein the process further comprises adjusting operation of the first and second light sources over a predetermined period of time in which emissions of the second light source varies.

13. The lighting system of claim 9, wherein the compensation data includes data from a normalized model for the first and second light sources.

14. The lighting system of claim 9, wherein the temperature compensation data includes reference emission characteristics for the first and second light sources.

15. The lighting system of claim 9, wherein the temperature compensation data includes color temperature relationships for the first and second light sources.

16. A lighting system, comprising:

a solid state lighting device having a first light source, a second light source, and a single color sensor configured to detect light from the first light source, wherein the solid state lighting device uses only the single color sensor; and a controller communicatively coupled to the solid state lighting device, the controller has memory containing instructions for causing the lighting system to performing a process including:

measuring an emission characteristic of light generated by the first light source;

determining a first relationship between light intensity of one or more emissions from the first light source and an operational characteristic of the first light source;

determining a second relationship between light intensity of the second light source and an operational characteristic of the second light source;

controlling operation of the solid state lighting device based on both the first relationship and the second relationship; and controlling the second light source to compensate for temperature effects on one or more emissions from the second light source to produce mixed light without any second light source temperature measurements associated with the temperature effects, wherein the mixed light is produced based on one or more predetermined correlations between the measured emission characteristic and the one or more emissions from the second light source.

17. The lighting system of claim 16, wherein the process further comprises in response to temperature changes of the second light source, compensating, based on temperature compensation data stored by the memory, for emission changes of the second light source.

* * * * *